(12) United States Patent
Ito et al.

(10) Patent No.: US 7,254,882 B2
(45) Date of Patent: Aug. 14, 2007

(54) SEALING METHOD FOR THROUGH HOLE FORMED IN METAL HOUSING

(75) Inventors: Tokichi Ito, Kyoto (JP); Nobuaki Watanabe, Kyoto (JP); Yoshito Oku, Kyoto (JP); Hiroyuki Yonei, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/498,106

(22) Filed: Aug. 3, 2006

(65) Prior Publication Data

US 2006/0265871 A1 Nov. 30, 2006

Related U.S. Application Data

(62) Division of application No. 11/120,200, filed on May 3, 2005, now Pat. No. 7,105,963.

(30) Foreign Application Priority Data

Dec. 28, 2004 (JP) .............................. 2004-380711

(51) Int. Cl.
*H02K 15/00* (2006.01)
(52) U.S. Cl. ....................... 29/596; 29/603.03; 29/837; 310/71
(58) Field of Classification Search .......... 29/596–598, 29/603.03, 830–834, 846–852, 855; 360/97.01–97.04, 360/98.01, 265.2–165.03, 99.08; 174/50, 174/52.1, 52.5; 310/45, 67 R, 71, 89; 439/535, 439/66
See application file for complete search history.

(56) References Cited

U.S. PATENT DOCUMENTS

| | | | |
|---|---|---|---|
| 4,985,793 A | 1/1991 | Anderson | |
| 5,454,157 A * | 10/1995 | Ananth et al. | 29/603.03 |
| 5,672,927 A * | 9/1997 | Viskochil | 310/194 |
| 5,986,365 A * | 11/1999 | Kuwert et al. | 310/51 |
| 6,071,014 A * | 6/2000 | Lee et al. | 384/107 |
| 6,556,372 B2 * | 4/2003 | Hearn et al. | 360/97.02 |
| 7,119,984 B2 * | 10/2006 | Macleod et al. | 360/97.01 |

FOREIGN PATENT DOCUMENTS

| | | |
|---|---|---|
| JP | 2661758 | 6/1997 |
| JP | 3373262 | 11/2002 |
| JP | 3373625 | 11/2002 |

* cited by examiner

*Primary Examiner*—Minh Trinh
(74) *Attorney, Agent, or Firm*—Westerman, Hattori, Daniels & Adrian, LLP

(57) ABSTRACT

The present invention provides a method for sealing a metal housing member. A housing through hole is formed in a housing member for a lead wire sealing device. The housing member is provided with a housing through hole formed on the metal housing member and penetrates from a closed space to an open space. A resin coating layer is formed to cover a lower surface of the housing member. A metal surface exposed part is formed on a part of the resin coating layer. The circuit board having a board aperture is mounted on the metal surface exposed part via an adhesive layer while overlapping with the board aperture on the housing through hole. The lead wire is inserted in the housing through hole and the board aperture that are overlapped with each other. The sealing material is provided on the circuit board to cover the board aperture.

4 Claims, 11 Drawing Sheets

SEALING METHOD FOR THROUGH HOLE FORMED IN METAL HOUSING

This application is a divisional of U.S. patent application Ser. No. 11/120,200 filed on May 03, 2005, now U.S. Pat. No. 7,105,963, the entire contents of which are hereby incorporated by reference.

BACKGROUND OF THE INVENTION

1. Field of the Invention

The present invention relates to a lead wire sealing device, a motor including an electric motor, and a method for sealing a housing through hole formed on a housing member of the motor. Preferably, the motor is utilized by a recording disk drive for driving a recording disk.

2. Description of the Related Art

Conventionally, in a recording disk drive such as a hard disk drive or the like, a through hole is formed on a bracket of a spindle motor and/or a housing of the recording disk drive to connect a lead wire as a part of windings of the spindle motor or the like to a printed circuit board provided in the outside of the housing or the like.

For example, forming a bracket through hole having a lead wire of the windings inserted therein on the bracket of a spindle motor, a through hole is formed on a flexible printed circuit board (hereinafter, referred to as an FPC) and this FPC through hole is located just under this bracket through hole. Further, the size of this FPC through hole is made smaller than that of the bracket through hole and whereby the FPC through hole is fit inside of the bracket through hole and when the lead wire of the windings is pulled out via the bracket through hole and the FPC through hole, the lead wire has little risk to contact directly the inner edge of the bracket through hole. The technology that the lead wire is prevented from contacting the bracket in this way omits a contact protection component such as a rubber tube or the like.

In the meantime, in the hard disk drive, by sealing the closed space of the housing having a recording disk housed therein as separated from the outside, an air around the recording disk is kept clean. Then, in order to prevent air leak to the closed space and maintain a sealed condition, the bracket through hole for pulling out the lead wire formed on the housing is sealed by a sealing material.

On the other hand, in late years, the hard disk drive is also utilized in a car navigation system and high decay durability is required from a car-mounted hard disk drive. For example, in a heating and humidification test, an endurance test of 1,500 hours under temperature 90° C. and humidity 95% is done. In addition, in a heat shock test, an endurance test to repeat cooling and heating for each fifteen minutes under temperatures (−40) ° C. and 85° C. alternately 1,500 times is done.

Under such a severe test condition, a sealing material to seal the through hole and an adhesive layer to adhere a circuit board on the housing may be deteriorated. If the adhesive layer is deteriorated, the adhesive layer to adhere the circuit board on the housing is separated from the housing, and a gap is formed between the housing and the circuit board. As a result, a gas may enter the closed space of the housing and the inner air of the housing cannot be kept clean from outside.

SUMMARY OF THE INVENTION

The present invention has been made taking the foregoing problems into consideration and an object of the present invention is to certainly seal a housing through hole of a housing member by improving adhesiveness between the circuit board and the housing member.

The other object of the present invention is to provide a lead wire sealing device having excellent reliability and durability, and a recording disk drive.

Therefore, a lead wire sealing device according to an example of the present invention may comprise a metal housing member that is a part of a housing which forms a closed space, an electric component that is housed in the closed space, and a lead wire of the electric component connecting from the electric component to an electrode. In addition, the lead wire sealing device may comprise a housing through hole, which is formed in the metal housing member and into which the lead wire is inserted, and a circuit board, which is mounted on a lower surface of the metal housing member and to which the lead wire inserted in a board aperture is connected.

On the lower surface of the metal housing member, a resin coating layer is formed so as to coat the lower surface of the metal housing member, a metal surface exposed part is formed on a part of the resin coating layer, and the circuit board is securely held on the metal surface exposed part via the adhesive layer. Then, a board aperture of the circuit board is sealed by a sealing material from an open space.

A recording disk drive according to an example of the present invention may comprise a housing which forms a closed space therein and has a metal housing member at a lower side of the housing, an electric motor including a stator and a rotor, and a lead wire connecting from the stator to an electrode electrically isolated from and formed on a lower surface of the metal housing member for making an electrical connection with an outer device located in an open space.

a housing through hole, which penetrates from the closed space to the open space, and has the lead wire inserted therein, is formed in the housing. A circuit board, which has a board aperture overlapped to the housing through hole, is mounted on the lower surface of the metal housing member.

A resin coating layer is formed so as to coat the lower surface of the metal housing member, and a metal surface exposed part of the metal housing member is formed on a part of the resin coating layer. The circuit board is securely held on the metal surface exposed part via an adhesive layer.

A sealing material fills the board aperture of the circuit board at the open space.

A method of sealing a housing through hole formed in the metal housing member of the lead wire sealing device as an example of the present invention may comprise the steps of preparing a housing member provided with a housing through hole formed on the metal housing member and penetrating from the closed space to the open space, a resin coating layer formed to cover the lower surface of the housing member, and a metal surface exposed part formed on a part of the resin coating layer;

In addition, the method of sealing the housing through hole may comprise the steps of mounting the circuit board having a board aperture on the metal surface exposed part via an adhesive layer while overlapping the board aperture on the housing through hole, inserting the lead wire in the housing through hole and the board aperture that are overlapped each other, and providing the sealing material on the circuit board to cover the board aperture.

According to the lead wire sealing device, recording disk drive and the method of sealing the housing through hole of the lead wire sealing device as an example of the present invention, it is possible to certainly seal the housing through hole of the housing member by improving the adhesiveness between the circuit board and the housing member.

DESCRIPTION OF THE PREFERRED EMBODIMENTS

Figure 1:
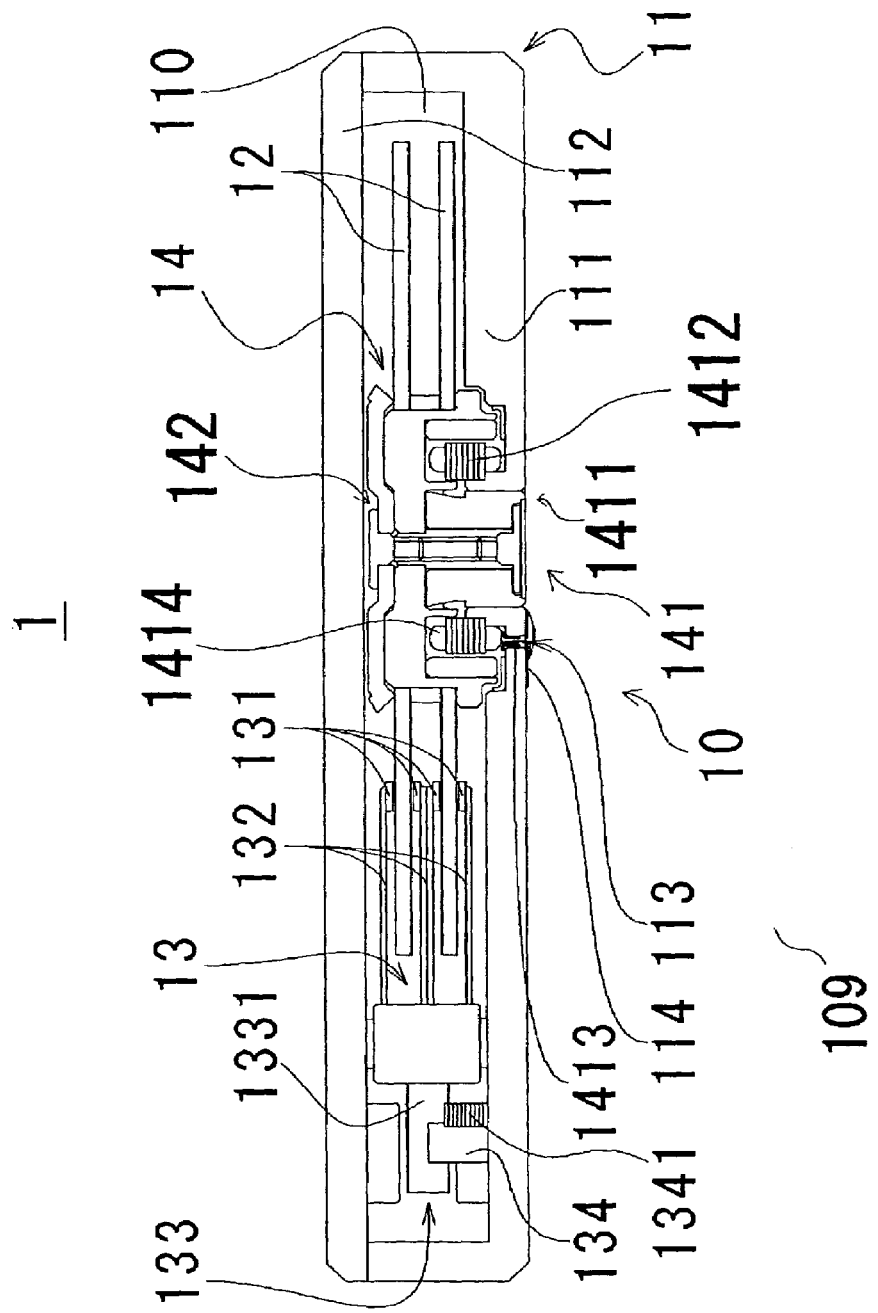
FIG. 1 is a view showing an inner configuration of a recording disk drive.

With reference to the drawings, an embodiment of the present invention will be described below. In the meantime, when explaining positional relations and directions of respective members vertically and horizontally in the following description, the positional relations and directions on the drawing are merely described differently from the positional relations and directions when respective members are incorporated in a real apparatus.

A First Embodiment

<A Configuration of a Recording Disk Drive 1 and a Motor Unit 10>

FIG. 1 is a sectional view for showing an inner configuration of a recording disk drive 1 according to a first embodiment of the present invention. According to the present embodiment, the recording disk drive 1 is a hard disk drive of a car navigation system that is mounted on a car. The recording disk drive 1 is provided with a recording disk 12 of a disk type for recording the information, an access unit 13 for reading and (or) writing the information about the recording disk 12, an electric motor 14 rotating as holding the recording disk 12, and a housing 11 for housing the recording disk 12, the access unit 13, and the motor 14 in an closed space 110 and separating them from the outside.

The housing 11 is provided with a first metal housing member 111 of a platy type to which the motor 14 and the access unit 13 are attached and a second housing member 112 of a cap type for forming the closed space 110 by covering a main surface at the side to which the motor 14 of the first metal housing member 111 and the access unit 13 are attached. The first metal housing member 111 and the second housing member 112 has a configuration such that the surface of the metal part made of aluminum is coated with a resin coated layer to be described later. In the recording disk drive 1, under a depressurized condition, the first metal housing member 111 is joined with the second housing member 112 to form the housing 11 and the closed space 110 is made into a clean space having remarkably less dust.

As shown in FIG. 1, the access unit 13 is provided with a magnetic head 131 for reading and writing the information as closing to the recording disk 12, an arm 132 supporting the magnetic head 131, a head moving mechanism 133 for changing a relative position of the magnetic head 131 and the recording disk 12 by moving the arm 132, and a latch mechanism 134 for fastening the arm 132 when the recording disk drive 1 stops and holding it at a certain position. Due to these configurations, the magnetic head 131 accesses a certain position of the recording disk 12 as closing to the rotating recording disk 12 to read and write the information.

The motor 14 is a motor provided with a static assembly 141 and a rotor assembly 142, and the rotor assembly 142 is rotatably supported against the static assembly 141 by a bearing. The static assembly 141 is provided with a stator 1411 having a stator core 1412 and a stator windings 1414, and the stator windings 1414 connected to the stator 1411 is inserted in a housing through hole 113 formed in the first metal housing member 111 as a part of the housing 11. A lead wire 1413 of the stator windings 1413 which is penetrates from the closed space 110 to the open space 109 via the housing through hole 113 is connected to an electrode of an FPC 114 that is mounted on a lower surface of the first metal housing member 111 via the adhesive layer and the housing through hole 113 is sealed by a sealing material to be described later from the side of the FPC 114. In the meantime, the stator windings 1414 and the lead wire 1413 are made of the same member and the vicinity of the member to be pulled from the housing through hole 113 to the open space 109 in the stator windings 1414 is described as "the lead wire 1413".

A half-finished motor 10 is provided with the motor 14 used for rotating the recording disk 12, a first metal housing member 111 having the housing through hole 113, to which the motor 14 is attached, the FPC 114 mounted on the first metal housing member 111, and an adhesive layer 115 (refer to FIG. 2) to bond the first metal housing member 111 to the FPC 114, and a sealing material 117 (refer to FIG. 2) to seal the housing through hole 113. In the actual recording disk drive 1, a through hole for pulling out the lead wire of a voice coil 1331 of the head moving mechanism 133 and a latch coil 1341 of the latch mechanism 134 or the like is also formed in the housing 11.

<Configuration of the First Metal Housing Member 111 and the Housing through Hole 113>

Figure 2:
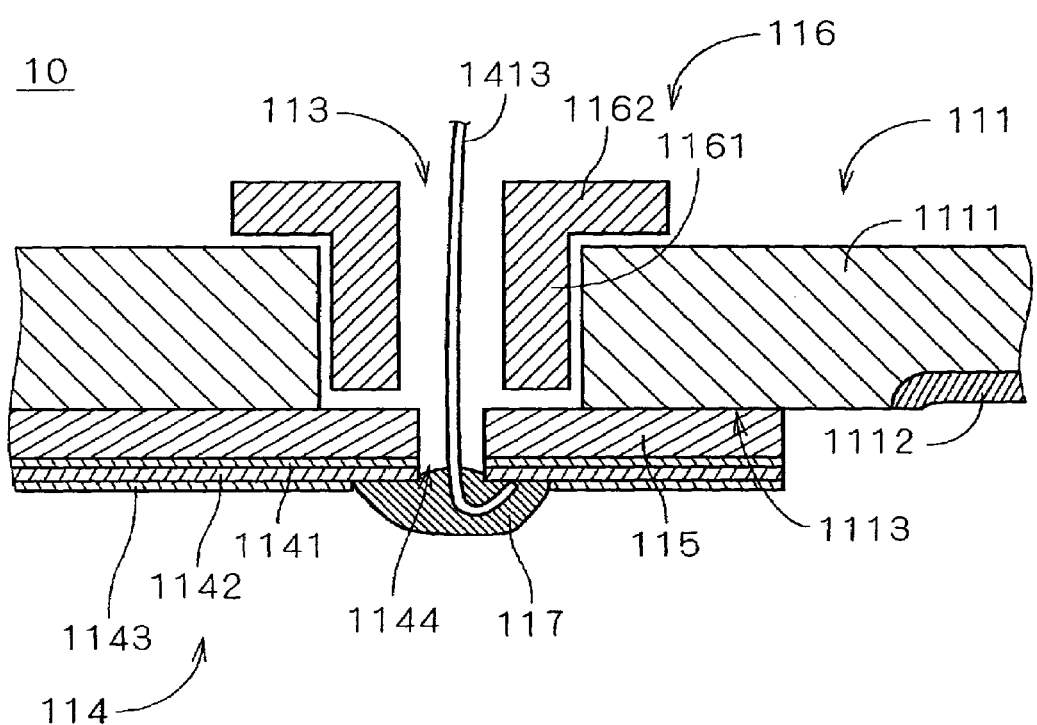
FIG. 2 is a sectional view enlarging a vicinity of a housing through hole.

FIG. 2 is a sectional view enlarging a vicinity of the housing through hole 113 formed on the first metal housing member 111 of the motor unit 10. As shown in FIG. 2, the first metal housing member 111 is provided with a bottom plate part 1111 made of aluminum as a metal part of the first metal housing member 111 and a resin coating layer 1112 formed on the lower surface of the bottom plate part 1111. Around the housing through hole 113, on a metal surface exposed part (namely, a part of the surface of the bottom plate part 1111) 1113 exposed from the resin coating layer 1112, the FPC 114 is mounted via the adhesive layer 115. Hereinafter, the metal surface exposed part 1113 is called as "a board mounted part 1113". An average roughness of ten points (Rz) indicating a surface roughness of the bottom plate part 1111 at the board mounted part 1113 is about 3.2 μm and the thickness of the adhesive layer 115 is about 125 μm. In the meantime, in the first metal housing member 111, the resin coating layer is also formed on the upper surface of the bottom plate part 1111. However, the motor 14 (refer to FIG. 1) is attached to a part shown in FIG. 2, so that the resin coating layer is not formed.

The bottom plate part 1111 is a cast metal made of aluminum that is formed according to a die casting method as a casting system for filling the molten metal into a precise molding with a high shape accuracy, namely, so-called aluminum die case, and its surface is smoothly formed. An average roughness (Ra) of a center line on the surface of the bottom plate part 1111 is about 6.3 μm. The resin coating layer 1112 is formed so as to cover the surface of the bottom plate part 1111 by electrodeposition coating and this prevents dispersion of impure substances such as particles from the surface of the bottom plate part 1111 made of aluminum. In addition, by providing the resin coating layer 1112, an insulation performance and a corrosion resistance of the first metal housing member 111 are improved. According to the present embodiment, the thickness of the resin coating layer 1112 is about 50 μm.

An approximately tubular bush 116 made of resin is inserted in the housing through hole 113 to be attached to the bottom plate part 1111 of the first metal housing member 111 by an adhesive or the like (its illustration is omitted). The bush 116 is provided with a cylindrical part 1161 and a flange part 1162 of a ring shape to be attached on the upper part of the cylindrical part 1161. The cylindrical part 1161 may cover the inner circumferential surface of the housing through hole 113 as being inserted in the housing through hole 113. The flange part 1162 is extended from the cylindrical part 1161 in a radial direction to cover an edge of an aperture of the housing through hole 113 at the closed space 110. Further, the bush 116 may be attached to the first metal housing member 111 when it is put into the housing through hole 113 by press fitting.

In the real recording disk drive 1, the lead wire 1413 is pulled out from the closed space 110 (refer to FIG. 1) of the housing 11 through the inside of the bush 116 to the open space 109. Since the edge of the aperture of the housing through hole 113 at the closed space 110 is covered with the flange part 1162 of the bush 116, disconnection of the lead wire 1413 due to contact of the lead wire 1413 and the edge is prevented. In addition, since the inner circumferential surface of the housing through hole 113 is covered with the cylindrical part 1161 of the bush 116, contact of the lead wire 1413 and the inner circumferentail surface of the housing through hole 113 is prevented and the lead wire 1413 and the first metal housing member 111 are electrically insulated.

<A Configuration of an FPC 114>

The FPC 114 has a three-layered structure including a copper foil layer 1142 that is made into a windings and an electrode or the like made of a rolling copper, and a first insulation layer 1141 and a second insulation layer 1143 made of a polyimide film for insulating and protecting the copper foil layer 1142 from the open space 109 as putting the copper foil layer 1142 therebetween. In addition, the FPC 114 is provided with a board aperture 1144 of an approximately circle penetrating these layers 1141 to 1143. The thickness of the first insulation layer 1141 and the second insulation layer 1143 are about 25 μm, and the thickness of the copper foil layer 1142 is about 35 μm. The FPC 114 is arranged so that the board aperture 1144 overlaps the housing through hole 113 (or the aperture of the bush 116 attached to the housing through hole 113). A diameter of the board aperture 1144 is smaller than that of the housing through hole 113.

As shown in FIG. 2, the second insulation layer 1143 is not provided around the board aperture 1144 of the FPC 114 and the lead wire 1413 inserted in the housing through hole 113 and the board aperture 1144 is bonded to the copper foil layer 1142 that is exposed around the board aperture 1144 (namely, the electrode) by soldering. In the motor unit 10, when the board aperture 1144 is covered from the open space 109 to be closed by a solder used for bonding the lead wire 1413, the housing through hole 113 is sealed. In other words, a sealing material 117 covering the board aperture 1144 and sealing the housing through hole 113 is a solder used for bonding the lead wire 1413 to the FPC 114.

<Sealing Method of the Housing through Hole 113>

Figure 3:
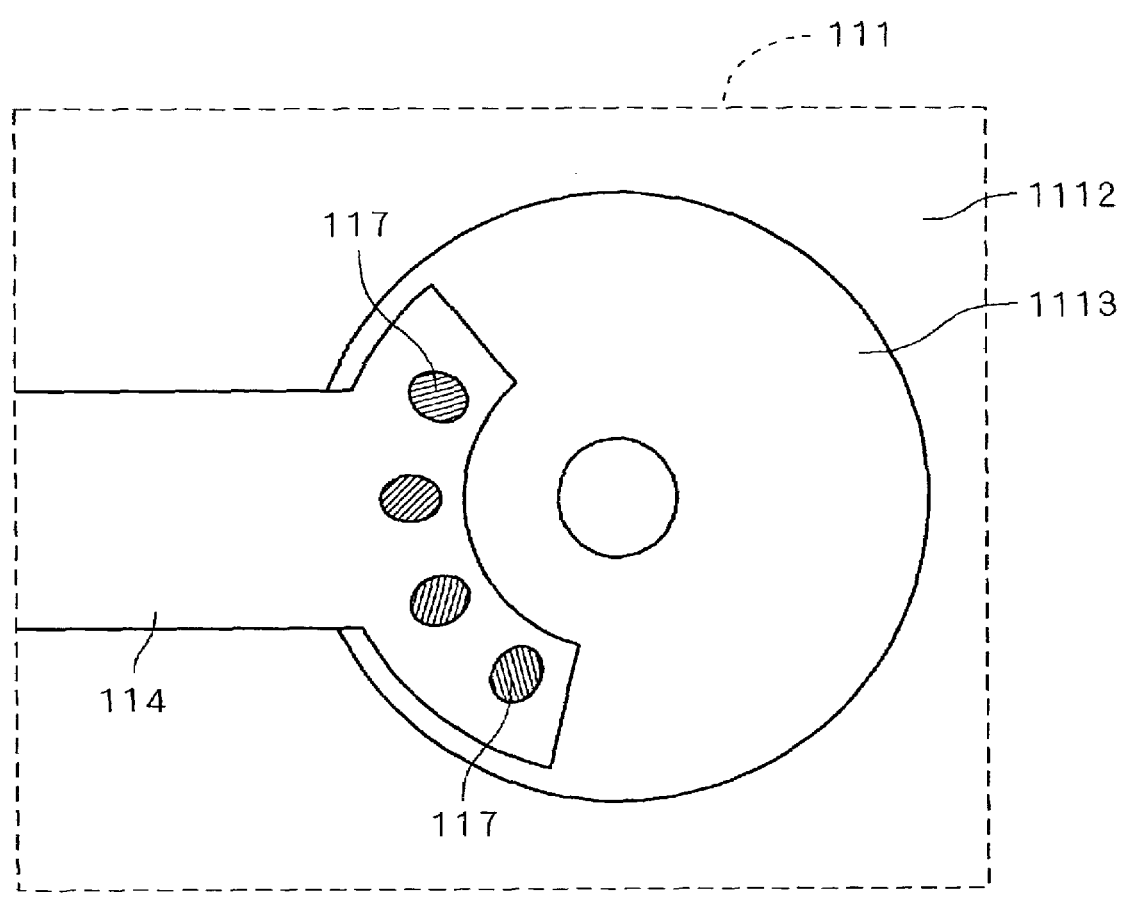
FIG. 3 is a bottom view partially showing a first metal housing member.

FIG. 3 is a bottom view partially showing the first metal housing member 111. As shown in FIG. 3, the board mounted part 1113 shaped in a circle is largely formed in accordance with an area where the motor 14 is attached (refer to FIG. 1), and a periphery of the board mounted part 1113 is made lower so that the board mounted part 1113 is slightly projected and the resin coating layer 1112 is formed. The FPC 114 is mounted on the board mounted part 1113 at a part of a front end thereof shaped in an approximately C-form. At the board mounted part 1113, four housing through holes 113 (refer to FIG. 2) are formed along with the part shaped in an approximately C-form, and as shown in FIG. 3, by four sealing materials 117, all of these housing through holes 113 are sealed.

Figure 4:
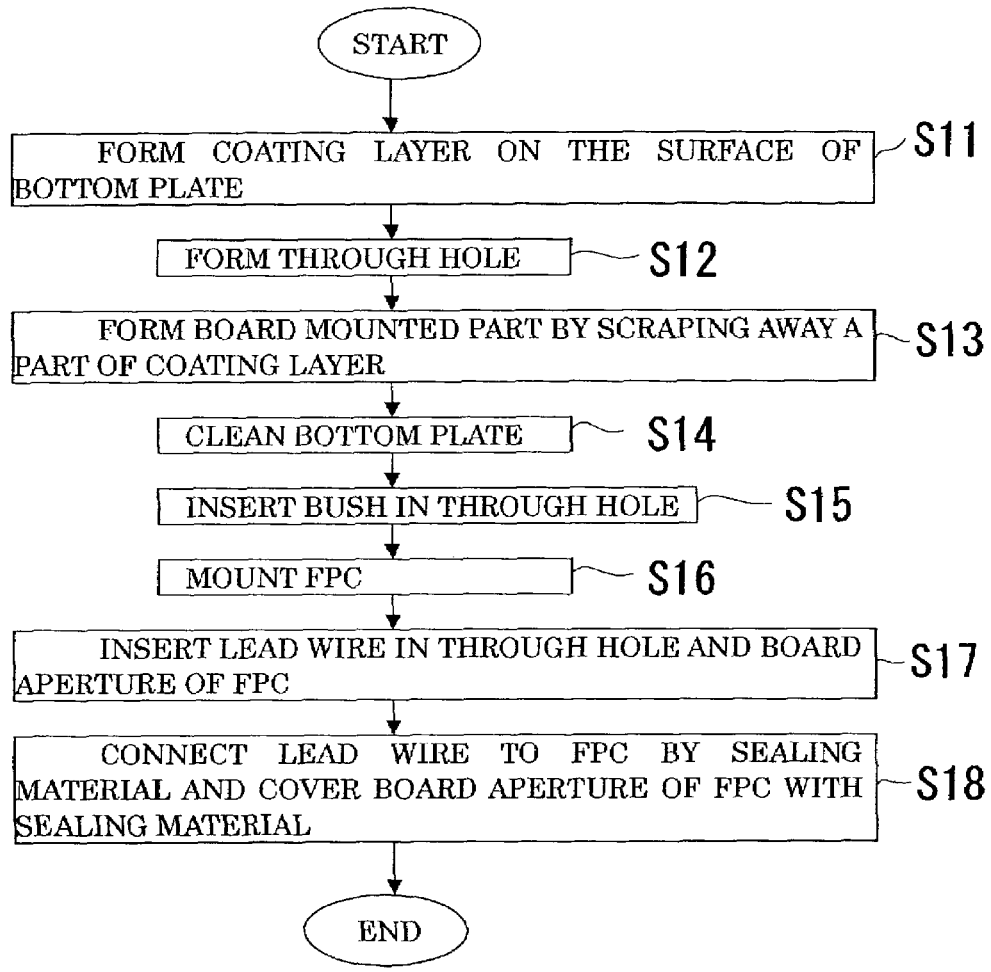
FIG. 4 is a view showing a flow of sealing of the housing through hole.

FIG. 4 is a view showing a flow of sealing of the housing through hole 113 that is formed in the first metal housing member 111 of the motor unit 10. The processing shown in FIG. 4 is carried out before a step that the second housing member 112 shown in FIG. 1 is connected to the first metal housing member 111 and the closed space 110 is formed. In the following description, a phrase of "the side of the closed space 110" in the first metal housing member 111, the bottom plate part 1111, the housing through hole 113, and the FPC 114 or the like means the side to which the second housing member 112 is directed when the second housing member 112 is finally connected to the first metal housing member 111 to form the closed space 110.

In the motor unit 10, the bottom plate part 1111 as a main part of the first metal housing member 111 shown in FIG. 2 is provided with a coating material made of a resin by electrodeposition coating and the resin coating layer is formed on the entire surface of the bottom plate part 1111. Thereby, the resin coating layer 1112 is formed on the lower surface of the bottom plate part 1111 at the part shown in FIG. 2 (step S11). Subsequently, the housing through hole 113 (and other housing through hole such as a screw hole or the like) penetrating the bottom plate part 1111 and the resin coating layer 1112 are formed (step S12).

If the resin coating layer 1112 and the housing through hole 113 are formed, by scraping away the part around the housing through hole 113 of the resin coating layer 1112 formed on the lower surface of the bottom plate part 1111 (namely, a part of the resin coating layer 1112) together with a part of the bottom plate part 1111 with a working tool such as end mill, the board mounted part 1113 exposed from the resin coating layer 1112 is formed (step S13). In this case, by controlling the working tool, the average roughness of ten points (Rz) of the board mounted part 1113 is about 3.2 μm.

In addition, since the part where the board mounted part 1113 is formed is projected as described above, it is possible to easily scrape away the surface of the projecting part and a part of the bottom plate part 1111. In addition, also in other places of the first metal housing member 111, the resin coating layer may be appropriately deleted according to need.

If the board mounted part 1113 has been completely formed, namely, if the housing through hole 113 is formed on the bottom plate part 1111 and the first metal housing member 111 in which the resin coating layer 1112 is formed on a major part of the surface of the bottom plate part 1111 excepting for the board mounted part 1113 is prepared, cleaning is carried out in such a manner that liquid is injected to the bottom plate part 1111. Subsequently, after supersonic wave cleaning, the bottom plate part 1111 is dried (step S14).

In the next place, in a clean room, the cylindrical part 1161 of the bush 116 is inserted into the housing through hole 113. Then, while covering the edge of upper side of the housing through hole 113 and abutting the upper and the inner circumreferential surface of the bottom plate part 1111, the flange part 1162 is fixed to the first metal housing member 111 by the adhesive or the like (step S15).

After the bush 116 is attached to the first metal housing member 111, the first metal housing member 111 is heated. After that, the adhesive is applied on the main surface of the first insulation layer 1141 and the FPC 114 on which the adhesive layer 115 is formed is mounted on the board mounted part 1113 via the adhesive layer 115 while overlapping the board aperture 1144 to the housing trough hole 113 (or the aperture of the bush 116 inserted in the housing trough hole 113) (step S16). Intensity of separating the FPC 114 from the bottom plate part 1111 is 1.56 N/20 nm. In the motor unit 10, when the FPC 114 is mounted, the first metal housing member 111 has been heated in advance, and thereby, a temperature of the adhesive layer 115 is also made higher and a viscosity is lowered, so that a flow property of the adhesive forming the adhesive layer 115 is improved. Therefore, the adhesive is inserted even in a minute concave part on the board mounted part 1113 so as to improve adhesiveness for the first metal housing member 111 of the adhesive layer 115. In the meantime, in the motor unit 10, after providing the adhesive to the board mounted part 1113 of the bottom plate part 1111 to form the adhesive layer 115, the FPC 114 may be mounted on the board mounted part 1113 via the adhesive layer 115.

The FPC 114 is mounted on the bottom plate part 1111, and the lead wire 1413 of the stator windings 1414 from the stator 1411 (refer to FIG. 1) is inserted in the housing through hole 113 (or the aperture of the bush 116 inserted therein) of the bottom plate part 1111 and the board aperture 1144 of the FPC 114 that are overlapped each other at the closed space 110 (step S17).

Then, the sealing material 117 as a solder is supplied on the FPC 114 at the open space 109 and the front end of the lead wire 1413 that is pulled out to the side of the FPC 114 is connected to the FPC 114 to cover the board aperture 1144 (step S18). Thus, in the motor unit 10, by closing the board aperture 1144 at the same time as connecting the lead wire 1413 to the FPC 114 by the sealing material 117 as a solder, the housing through hole 113 of the first metal housing member 111 is sealed.

A Comparative Embodiment

Figure 5:
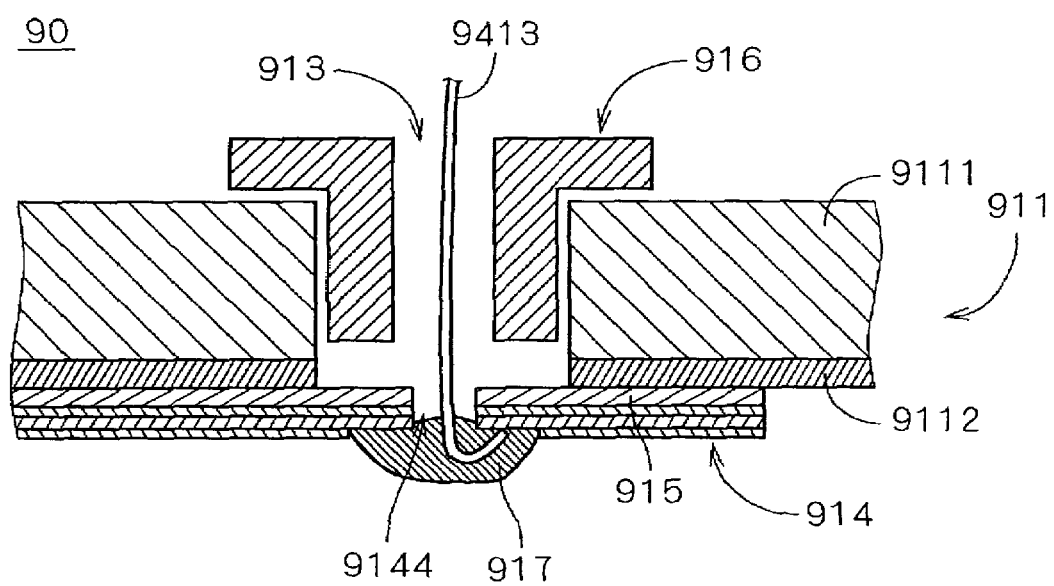
FIG. 5 is a sectional view enlarging a vicinity of a housing through hole of a comparative embodiment.

In the next place, as an example compared to the above-described motor unit 10, a motor 90 in which the FPC is mounted on the resin coating layer made of a resin covering the bottom plate part of the first metal housing member will be described below. FIG. 5 is a sectional view enlarging a vicinity of a housing through hole 913 of the motor 90 of the comparative embodiment.

As shown in FIG. 5, according to the motor 90 of the comparative embodiment, a resin coating layer 9112 made of a resin is formed on a lower surface of a bottom plate part 9111 as aluminum die casting by electrodeposition coating. After that, the housing through hole 913 is provided, a first metal housing member 911 is prepared, and a bush 916 is inserted in a first metal housing member 911. Subsequently, after an adhesive layer 915 of a thickness about 50 μm is formed on the resin coating layer 9112, an FPC 914 is mounted on the resin coating layer 9112 via the adhesive layer 915. Then, the inside of the bush 916 inserted in the housing through hole 913 and a lead wire 9413 inserted in a board aperture 9144 of the FPC 914 are connected to the FPC 914 by a sealing material 917 as a solder and further, the board aperture 9144 is covered with the sealing material 917 to seal the housing through hole 913.

As described above, according to the motor unit 90 of the comparative embodiment, the adhesive layer 915 is formed on the resin coating layer 9112 made of a resin. Therefore, the intensity of separating the FPC 914 from the first metal housing member 911 (or the resin coating layer 9112 thereof) is 1.39 N/20 mm. According to the motor unit 10 of the above-described first embodiment, the adhesive layer 115 is directly formed on the bottom plate part 1111 made of a metal. As a result, it is possible to increase the intensity of separating the FPC 114 from the first metal housing member 111 (or the bottom plate part 1111 thereof) to 1.56 N/20 nm. Thus, in the motor unit 10, by enhancing adhesiveness between the FPC 114 and the first metal housing member 111 (or the bottom plate part 1111 thereof), in an endurance test such as a heating and humidification test and a heat shock test or the like, it is possible to prevent the FPC 114 from being separated from the first metal housing member 111 and to securely seal the housing through hole 113 of the first metal housing member 111.

In the motor unit 10, since the surface roughness of the board mounted part 1113 of the bottom plate part 1111 is made smaller by the processing when the board mounted part 1113 is formed, it is possible to enhance adhesiveness between the FPC 114 and the first metal housing member 111. In view of enhancement of adhesiveness between the FPC 114 and the first metal housing member 111, it is preferable that the surface roughness of the board mounted part 1113 of the bottom plate part 1111 is smaller. In view of certainly preventing separation of the FPC 114 in the above-described endurance test, it is preferable that the average roughness of ten points (Rz) indicating the surface roughness of the board mounted part 1113 is not more than about 3.2 μm.

In addition, in the motor unit 10, by using the FPC 114, it is possible to easily deform the FPC 114 in accordance with the shape of the first metal housing member 111 (namely, the surface shape of the board mounted part 1113 of the bottom plate part 1111), so that adhesiveness between the FPC 114 and the first metal housing member 111 can be more enhanced.

As described above, in the motor unit 10, by enhancing adhesiveness between the FPC 114 and the first metal housing member 111, even if the FPC 114 is deformed due to a difference in a coefficient of thermal expansion between the FPC 114 and the bottom plate part 1111, it is possible to prevent the FPC 114 from being separated from the first metal housing member 111. Further, as compared to an adhesive layer 915 of a thickness about 50 µm according to the comparative embodiment, the adhesive layer 115 of a thickness about 125 µm can easily follow the modification of the contact part between the FPC 114 and the first metal housing member 111 such as deformation of the FPC 114 due to a difference of the coefficient of thermal expansion or the like. Therefore, even when a peripheral temperature is largely changed in the heat shock test or the like, it is possible to securely prevent the FPC 114 from being separated from the first metal housing member 111.

Thus, the motor unit 10 has a high durability against an environment in which a peripheral temperature is largely changed when sealing the housing through hole 113, so that it is preferable that the motor unit 10 is used for the recording disk drive 1 to be mounted in a car. Particularly, the recording disk drive 1 is suitable for a hard disk drive such as a car navigation system or the like requiring secure separation of the closed space 110 of the housing 11. In the comparative embodiment, the FPC 914 is mounted on the resin coating layer 9112, so that it is not possible to simply compare the embodiment with the comparative embodiment. However, in view of preventing separation of the FPC 114 in the heat shock test or the like, it is supposed that the thickness of the adhesive layer 115 is made more than 50 µm and it is expected that the adhesive property approximately the same as that of the present embodiment when the thickness of the adhesive layer 115 is not less than 100 µm. In addition, in view of making the motor unit 10 thinner, it is preferable that the thickness of the adhesive layer 115 is not more than 500 µm (more preferably, not more than 250 µm).

In the motor unit 10, the bottom plate part 1111 made of aluminum is covered with the resin coating layer 1112 that is electrodeposition coated in a major part other than the board mounted part 1113. Therefore, in the motor unit 10, even if the bottom plate part 1111 made of aluminum, from which surface particles or the like may be dispersed, is used as a main part of the first metal housing member 111, it is possible to prevent dispersion of the particles or the like and to enhance adhesiveness between the FPC 114 and the first metal housing member 111. Accordingly, the motor unit 10 is particularly suitable for the hard disk drive or the like such as the above-mentioned car navigation system or the like requiring secure sealing of the housing through hole 113 against impure substances such as the particles or the like.

In the motor unit 10, according to a step as same as a counterbore step around a screw hole to be carried out with respect to the first metal housing member 111, a part of the resin coating layer 1112 is removed to form the board mounted part 1113. Therefore, it is possible to simplify formation of the first metal housing member 111. In addition, sealing of the housing through hole 113 and connection of the lead wire 1413 to the FPC 114 are carried out by the sealing material 117 as a single material (namely, a solder) and this makes it possible to simplify manufacturing of the motor unit 10. Further, by carrying out sealing of the housing through hole 113 and connection of the lead wire 1413 in a single step, manufacturing of the motor unit 10 can be more simplified.

A Second Embodiment

Figure 6:
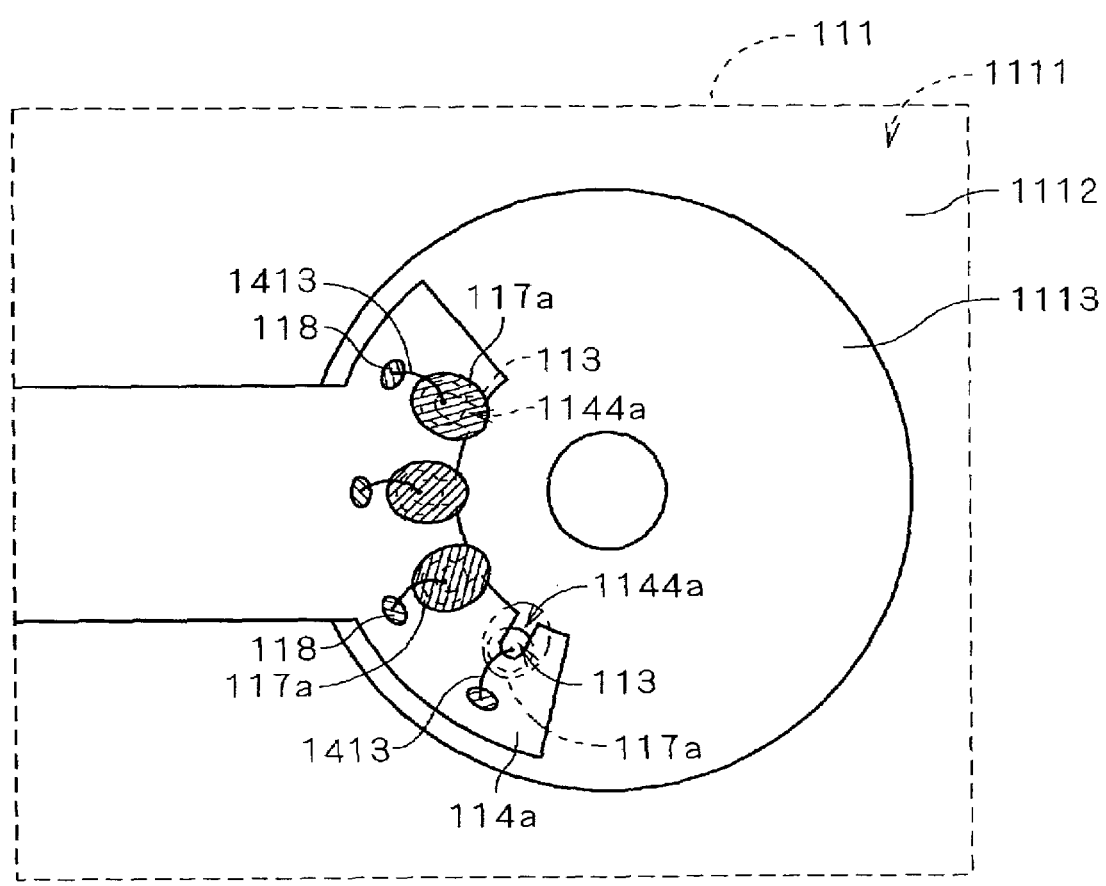
FIG. 6 is a view showing a second embodiment of a motor.

FIG. 6 is a view showing a second embodiment of a motor unit and is a bottom view corresponding to FIG. 3. An FPC 114a of the motor unit shown in FIG. 6 is provided with a board aperture 1144a that is providing by cutting the edge of the FPC 114a. In FIG. 6, a sealing material 117a to seal the board aperture 1144a and a solder 118 connecting the lead wire 1413 to the FPC 114a are provided with a parallel oblique line. However, in order to easily understand the shape of the board aperture 1144a, with respect to the board aperture 1144a at the lowest end of FIG. 6 among four board apertures 1144a, an outline of the sealing material a chain double-dashed line only indicates 117a.

Also in the example shown in FIG. 6, as same as the above-described first embodiment, a part of the resin coating layer 1112 formed on the bottom plate part 1111 is scraped away together with the bottom plate part 1111 and the FPC 114a is mounted on the board mounted part 1113 as the exposed metal surface exposed part via the adhesive layer. The lead wire 1413 is pulled out from the closed space 110 (refer to FIG. 1) to the open space 109 via the housing through hole 113 of the bottom plate part 1111 and a part of the board aperture 1144a overlapped to the housing through hole 113. After that, the lead wire 1413 is connected to an electrode of the FPC 114a by the solder 118. Then, the board aperture 1144a is covered with the sealing material 117a so as to seal the housing through hole 113. As a result, by enhancing adhesiveness between the FPC 114a and the first metal housing member 111, it is possible to securely seal the housing through hole 113. In the meantime, according to the example shown in FIG. 6, the sealing material 117a may be an insulation material.

<A Sealing Method of a Housing through Hole>

Figure 7:
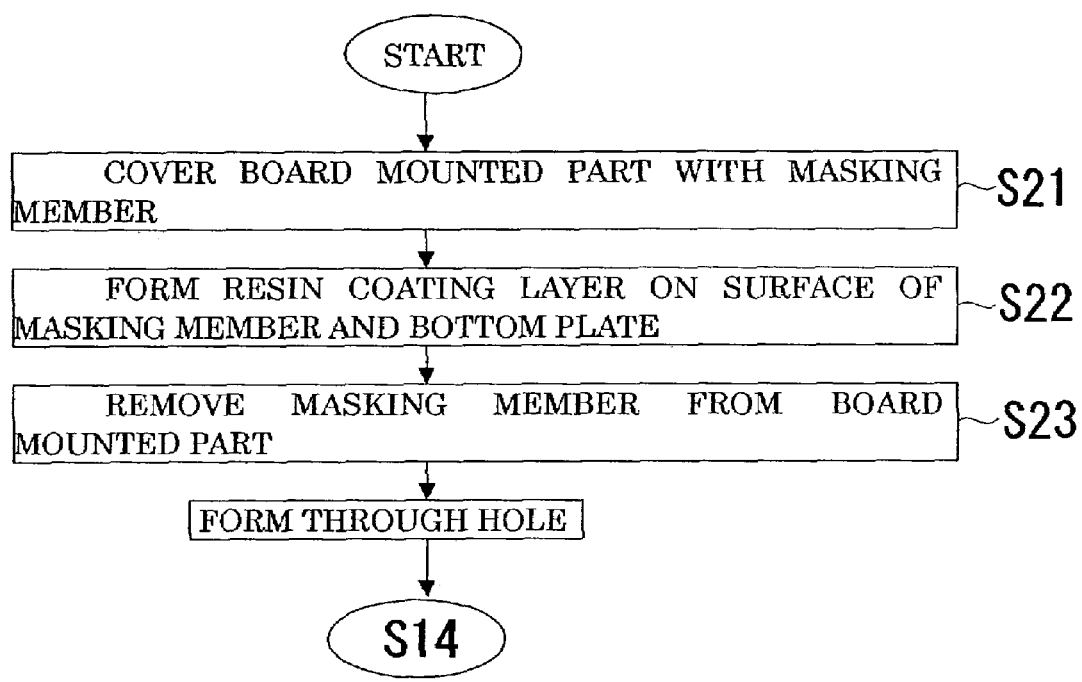
FIG. 7 is a view showing a flow of sealing of a housing through hole according to a second embodiment.

In the next place, a sealing method of the housing through hole of the motor unit according to the second embodiment of the present invention will be described below. The motor unit according to the second embodiment has a configuration as same as that of the motor unit 10 shown in FIGS. 1 to 3, and in the following description, respective configurations are given the same reference marks with reference to FIGS. 1 to 3 appropriately. FIG. 7 is a view showing a part of a flow of the processing with related to sealing of the housing through hole 113 according to the second embodiment. Steps after steps S21 to S24 are the same as steps S14 to S18 shown in FIG. 4. FIGS. 8 to 11 are sectional views showing a process of sealing the housing through hole 113.

Figure 8:
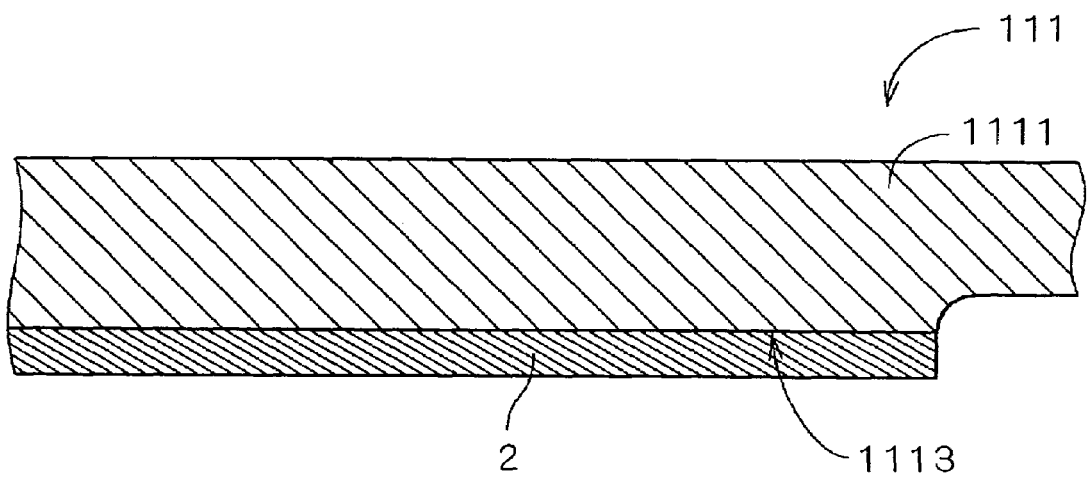
FIG. 8 is a sectional view showing a process of sealing the housing through hole.

According to the sealing method of the second embodiment, at first, as shown in FIG. 8, on the lower surface of the bottom plate part 1111 of the first metal housing member 111, a masking member 2 mounted to a part which finally becomes the board mounted part 1113 of the first metal housing member 111 (hereinafter, simply referred to as "the board mounted part 1113") so that the board mounted part 1113 is covered with a masking member 2 (step S21).

Figure 9:
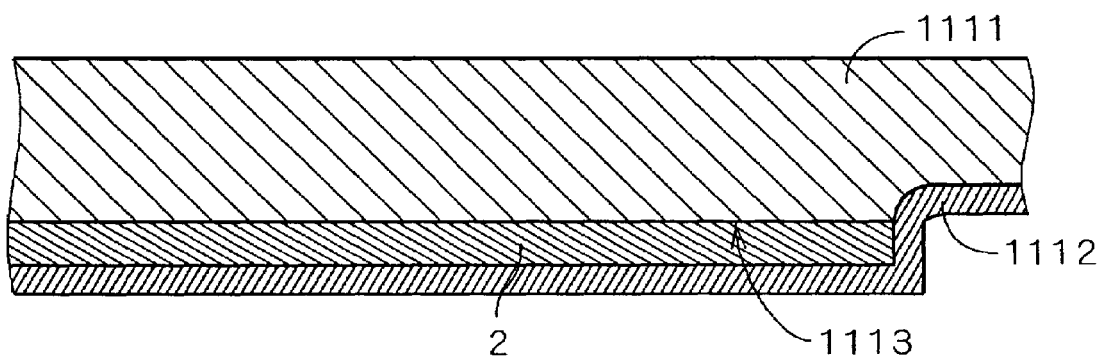
FIG. 9 is a sectional view showing a process of sealing the housing through hole.
Figure 10:
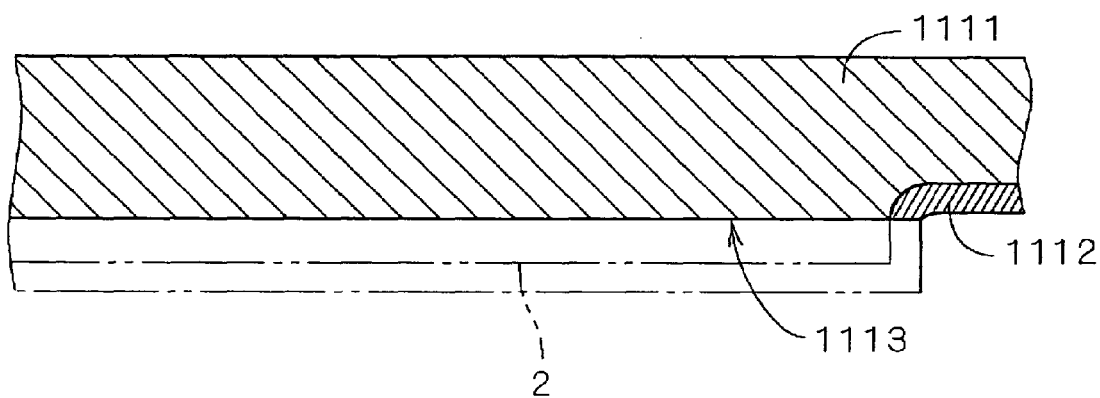
FIG. 10 is a sectional view showing a process of sealing the housing through hole.
Figure 11:
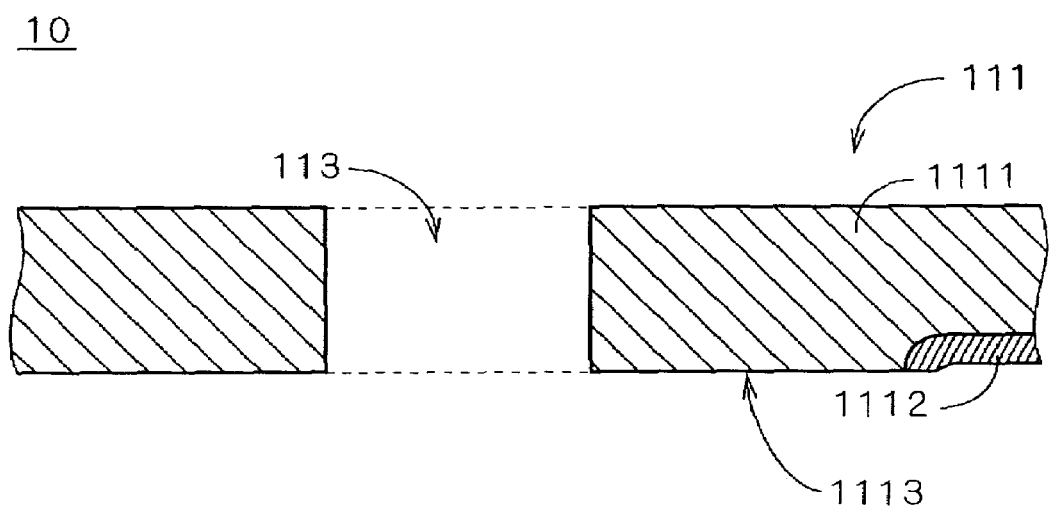
FIG. 11 is a sectional view showing a process of sealing the housing through hole.

If the board mounted part 1113 is covered with the masking member 2, a coating material made of a resin is given to the bottom plate part 1111 by electrodeposition coating. Then, as shown in FIG. 9, on the bottom plate part 1111 and the surface of the masking member 2, the resin coating layer 1112 is formed (step S22). Subsequently, as shown in FIG. 10, the masking member 2 is separated and removed from the board mounted part 1113 of the bottom plate part 1111, and thereby, the board mounted part 1113 is exposed from the resin coating layer 1112 (step S23). Then, as shown in FIG. 11, by forming the housing through hole 113 penetrating the bottom plate part 1111 at the board mounted part 1113, the first metal housing member 111, in which the resin coating layer 1112 is formed on a major part of the surface of the bottom plate part 1111 on which the housing through hole 113 is formed excepting for the board mounted part 1113, is prepared (step S24).

If the housing through hole 113 is formed, as same as the first embodiment, the bottom plate part 1111 is cleaned and dried (FIG. 4: step S14). Then, the bush 116 is fixed to the first metal housing member 111 by the adhesive or the like with the cylindrical part 1161 of the bush 116 inserted in the housing through hole 113 within a clean room as shown in FIG. 2 (step S15). After that, after heating the first metal housing member 111, the FPC 114 on which the adhesive layer 115 is formed is mounted to the board mounted part 1113 of the bottom plate part 1111 via the adhesive layer 115 (step S16). In this case, the board aperture 1144 and the housing trough hole 113 are overlapped each other. Then, the FPC 114 is mounted to the board mounted part 1113 at a part shaped in an approximately C-form at its front end (refer to FIG. 3).

Then, in the board aperture 1144 and the housing through hole 113 that are overlapped each other, the lead wire 1413 from the stator 1411 (refer to FIG. 1) is inserted (step S17). After that, by the sealing material 117 as a solder that is supplied on the FPC 114, the front end of the lead wire 1413 pulled out to the side of the FPC 114 is connected to the FPC 114 and the board aperture 1144 is covered (step S18).

Thus, also according to the sealing method of the second embodiment, as same as the first embodiment, due to closing of the board aperture 1144 carried out by the sealing material 117 at the same time as connection of the lead wire 1413 to the FPC 114, the housing through hole 113 is sealed. On the board mounted part 1113, four housing through holes 113 are formed along the part shaped in an approximately C-form and by four sealing materials 117, all of respective housing through holes 113 are sealed (refer to FIG. 3).

Also according to the sealing method of the second embodiment, as same as the first embodiment, since the adhesive layer 115 is directly formed on the metal bottom plate part 1111, it is possible to enhance adhesiveness between the FPC 114 and the first metal housing member 111 (or the bottom plate part 1111 thereof). Therefore, in an endurance test such as a heating and humidification test and a heat shock test or the like, it is possible to prevent the FPC 114 from being separated from the first metal housing member 111 and to securely seal the housing through hole 113 of the first metal housing member 111.

According to the sealing method of the second embodiment, particularly, due to separation of the masking member 2, the board mounted part 1113 can be exposed from the resin coating layer 1112 without machine processing. Therefore, it is possible to simplify the system of the first metal housing member 111. In addition, as same as the first embodiment, sealing of the housing through hole 113 and connection of the lead wire 1413 to the FPC 114 can be carried out in a single step by the sealing material 117 as a single material (namely, a solder), so that manufacturing of the motor unit 10 can be simplified.

The embodiments of the present invention are described as above, however, the present invention is not limited to the above-described embodiments and various modifications are available.

The lead wire to be inserted in the housing through hole 113 of the first metal housing member 111 is not always limited to the lead wire 1413 of the stator windings 1414 from the stator 1411 of the motor 14. For example, this lead wire may be a lead wire of a windings to be connected to other various configurations such as the lead wire of the windings from the voice coil 1331 of the head moving mechanism 133, and the lead wire of the windings from the latch coil 1341 of the latch mechanism 134 or the like.

The circuit board to be mounted on the first metal housing member 111 may be a rigid board. However, in view of enhancement of adhesiveness between the circuit board and the first metal housing member 111, it is preferable that the FPC 114 is used, which can be easily deformed in accordance with the shape of the surface of the board mounted part 1113. In the FPC 114, the first insulation layer 1141 and a second insulation layer 1143 putting the copper foil layer 1142 threbetween may be made of a material other than polyimide such as a heat-resisting polyester film or the like.

In addition, adhesion of the FPC 114 to the first metal housing member 111 may be carried out via the adhesive layer as a kind of the adhesive layer 115 and a thermoplastic adhesive may be used as the adhesive layer. The thermoplastic adhesive is cured after being molten once when adhering something, so that preventing air bubbles from left between the FPC 114 and the first metal housing member 111, it is possible to more enhance adhesiveness between the FPC 114 and the first metal housing member 111.

The bottom plate part 1111 of the first metal housing member 111 may be formed by a metal other than aluminum. For example, an aluminum alloy, an iron, and a stainless steel (it may be a magnetic body or a no-magnetic body) can be as the bottom plate part 1111.

The first metal housing member 111 may be formed by a method other than the methods that are described according to the above-described respective embodiments. For example, by scraping away only a part of the resin coating layer 1112 that is formed on the surface of the bottom plate part 1111 without scraping away a part of the bottom plate part 1111, the board mounted part 1113 as the metal surface exposed part may be exposed. Thereby, the housing through hole 113 of the housing and the first metal housing member 111 in which the resin coating layer 1112 is formed on a major part of the surface of the bottom plate part 1111 except for the board mounted part 1113 are formed. In addition, polish may be applied to the board mounted part 1113. In view of more enhancement between the FPC 114 and the first metal housing member 111, it is more preferable that mirror finish is applied to the board mounted part 1113. The board mounted part 1113 may substantially be a metal surface exposed part exposed from the resin coating layer 1112 and for example, the board mounted part 1113 may be a metal surface exposed part on which surface finishing such as alumite finishing or the like is carried out.

The first metal housing member 111 of the motor unit 10 according to the above-described embodiment may be at least a part of the housing 11 and may be a part other than the first metal housing member 111 (for example, a part of the second housing member 112 and the second housing member 112). In addition, the first metal housing member 111 may be formed to be integrated with the housing 11.

The motor unit 10 may be used for various recording disk drive s other than the hard disk drive such as a removable disk drive or the like. For example, in the case that the motor unit is used for the apparatus in which the closed space is not separated from the open space such as a compact disk drive or the like, by preventing separation of the FPC, it is possible to enhance reliability of the apparatus. In addition, when the motor unit 10 is used for the apparatus other than the hard disk drive such as the compact disk drive or the like, including a silicon (Si) in the adhesive layer 115, the separation intensity between the FPC 114 and the bottom plate part 1111 may be more increased.

What is claimed is:

1. A method of sealing a metal housing member that is a part of a housing which forms a closed space therein and includes an electric component housed therein, a lead wire connecting from the electric component to an electrode formed on an lower surface of the metal housing member in an open space, and a circuit board that is mounted on the lower surface of the metal housing member; the method comprising the steps of:

preparing the metal housing member provided with a housing through hole formed on the metal housing member and penetrating from the closed space to the open space, a resin coating layer formed to cover the lower surface of the metal housing member, and a metal surface exposed part formed on a part of the resin coating layer;

mounting the circuit board having a board aperture on the metal surface exposed part via an adhesive layer while overlapping the board aperture on the housing through hole;

inserting the lead wire of the electric component into the housing through hole and the board aperture that are overlapped each other; and providing the sealing material on the circuit board to cover the board aperture.

2. The method of sealing the housing through hole that is formed in the metal housing member according to claim 1, wherein the step of preparing the metal housing member further comprises the step of forming the resin coating layer on the lower surface of the metal housing member and the step of forming the metal surface exposed part that is exposed by scraping away the lower surface of the metal housing together with a part of the resin coating layer.

3. The method of sealing the housing through hole that is formed in the metal housing member according to claim 1, wherein the step of preparing the metal housing member further comprises the step of covering a part of the metal housing member with a masking member; forming the resin coating layer on the metal housing member and the surface of the masking member; and exposing the metal surface exposed part by removing the masking member from the metal housing member.

4. The method of sealing the housing through hole that is formed in the metal housing member according to claim 1, wherein the sealing material covering the board aperture is a solder to be used for connecting the lead wire to the circuit board; and in the step of covering the board aperture, the lead wire is connected to the circuit board at the same time as closing of the circuit board by the sealing material.

* * * * *